UNITED STATES PATENT OFFICE.

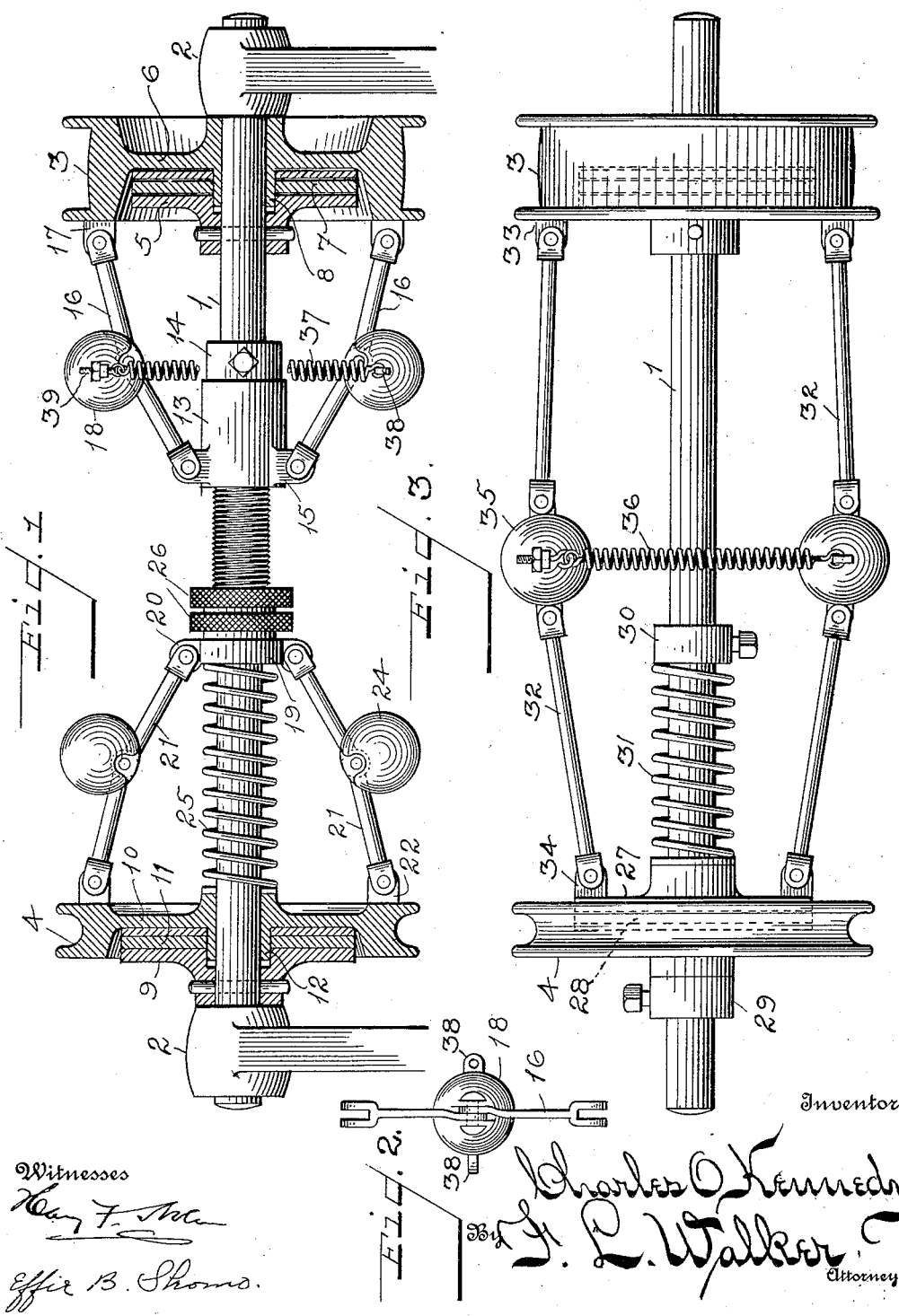

CHARLES O. KENNEDY, OF SERVIA, INDIANA.

SPEED-GOVERNOR DEVICE.

1,062,780.  Specification of Letters Patent.  Patented May 27, 1913.

Application filed November 25, 1912.  Serial No. 733,373.

*To all whom it may concern:*

Be it known that I, CHARLES O. KENNEDY, a citizen of the United States, residing at Servia, in the county of Wabash and State of Indiana, have invented certain new and useful Improvements in Speed-Governor Devices, of which the following is a specification.

My invention relates to speed regulators and particularly to means for insuring the driving of a machine at a uniform rate of speed by neutralizing the spasmodic action of a driver having a variable tendency.

The device is adapted to eliminate any jerkiness or unevenness of motion at the starting of the mechanism and to maintain the speed of the driven machine within definite prescribed limits obviating any tendency to intermittently increase the speed beyond such limits.

The mechanism forming the subject matter hereof is designed as an intermediate driving connection between an explosive engine, the speed of which, as is well known, varies spasmodically, momentarily increasing with each explosion, and a cream separator the weighted bowl of which is rotated at an extreme high rate of speed thereby rendering it highly sensitive to any fluctuations of speed of the driving motor.

On account of the multiple gearing of a cream separator whereby the weighted bowl is rotated at a high rate of speed, it is desirable that the mechanism be started slowly and its rate of speed gradually increased till the normal rate of speed is attained, and that such normal rate of speed may be maintained constant throughout the operation of the machine. While the mechanism forming the subject matter hereof is particularly designed for transforming the spasmodic action of the explosive engine into a uniform movement suitable for driving a cream separator, it is to be understood that it is not limited to this use but may be employed in any situation or in connection with any driving motor or mechanism wherein similar conditions arise and a uniform driving speed is to be desired.

The object of the invention is to simplify the structure as well as the means and operation of such devices whereby they will not only be cheapened in their actions, sensitive to slight variations in speed and unlikely to get out of repair.

A further object of the invention is to provide means for insuring a gradually increasing initial speed until a normal predetermined speed has been attained and to maintain the subsequent operations at a constant speed eliminating spasmodic variations of speed and further to provide means for readily and quickly varying the normal speed limit.

With the above primary and other incidental objects in view as will more fully appear in the specification, the invention consists of the features of construction, the parts and combinations thereof and the mode of operation or their equivalents as hereinafter described and set forth in the claims.

In the drawings, Figure 1 is a side elevation partly in section of the speed regulator forming the subject matter hereof. Fig. 2 is a detail view of one of the toggle links and the governor weight carried thereby. Fig. 3 is a side elevation of a modification of the mechanism.

Like parts are indicated by similar characters of reference throughout the several views.

It is to be understood that the regulator forming the subject matter hereof is to be employed as a counter driving connection intermediate an engine, motor or other source of power and the driven machine which it is desired to drive at a constant rate of speed. A driving belt connects the motor or other source of power with the regulator and a second belt connects the regulator with the driven machine. Referring to the drawings, 1 is a revoluble shaft journaled in suitable bearings 2—2. Loosely journaled upon the shaft 1 are a drive pulley 3 connected by a belt with the motor and a driven pulley 4 connected by a second belt with the driven machine. These pulleys 3 and 4 are free to rotate upon the shaft 1 except as controlled by the frictional driving connections as hereinafter described. Secured in a fixed position upon the shaft 1 by pinning or by other means, adjacent to the pulley 3 is a clutch disk 5 forming a part of the frictional clutch mechanism. Located intermediate the clutch disk 5 and web 6 of the pulley 3 are one or more independent friction disks 7. These friction disks 7 are preferably, though not necessarily, loosely journaled upon an inner projecting sleeve or hub 8 carried by the pulley 3. Secured in fixed position upon the shaft 1 adjacent to the driven pulley 4 is a second clutch disk 9. Located intermediate the clutch disk 9 and web 10 of the pulley 4 are one or more friction disks 11 loosely journaled upon the sleeve or hub 12 of the pulley 4. This frictional clutch mechanism of the driven pulley 4 is similar to that before described in connection with the driving pulley 3. Loosely journaled upon the shaft 1 adjacent to the pulley 3 is a sleeve 13 which is free to rotate upon the shaft 1 but which is prevented from longitudinal movement thereon by a fixed collar 14. The revoluble sleeve 13 is provided with a plurality of lugs or ears 15 to each of which is pivotally attached one end a pair of toggle links 16 the opposite extremity of which engages a corresponding lug 17 upon the drive pulley 3. At their central points the toggle links 16 carry governor weights 18 adapted to be carried outward by centrifugal tendency as the pulley 3 is rotated. Inasmuch as the revoluble sleeve 13 is prevented a longitudinal movement upon the shaft 1 by the fixed collar 14 against which the sleeve 13 abuts the outward movement of the governor weights 18 will be compensated by a longitudinal movement of the pulley 3 upon the shaft. This longitudinal movement of the drive pulley 3 under the influence of the centrifugal tendency of the governor weights 18 causes the web 6 of the pulley, the frictional disks 7, and the clutch disk 5 to be successively engaged one with the other to form a frictional driving connection between the pulley 3 and the shaft 1. It will be understood that when at rest the pulley 3 is disconnected from the shaft 1, the web 6, the disk 7, and the clutch disk 5 being out of frictional contact with the other. However, the initial rotation of the pulley 3 will cause an outward movement of the governor weights 18 thereby drawing the drive pulley 3 longitudinally upon the shaft into slight engagement with the disks 7. This will serve to start the rotation of the shaft 1 and mechanism driven thereby. As the speed increases the weights 18 are moved outward additional distances, causing frictional engagement of the web, the friction disks and the clutch disk to become more positive until the normal rate of speed is attained and the shaft 1 and the machine connected therewith are being driven in unison with the drive pulley 3. Revolubly mounted upon the shaft 1 adjacent to the driven pulley 4 is a second sleeve or collar 19. The collar 19 is provided with a plurality of lugs or ears 20 to each of which is connected one end of a pair of toggle links 21 the opposite ends of which are pivotally conected to corresponding lugs or ears 22 on the driven pulley 4. The toggle links 21 carry at their medial juncture points governor weights 24. As thus far described the construction is exactly the same as before described in connection with the drive pulley 3. The collar or sleeve 19 is not only capable of revoluble movement upon the shaft 1 but is also capable of a longitudinal movement thereon as is also the driven pulley 4. Interposed between the sleeve or collar 19 and the driven pulley 4 and surrounding the shaft 1 is a helical spring 25. The spring 25 bearing at one end upon the collar 19 and at its opposite end upon the driven pulley 4 normally holds the web 10 of the pulley 4, the friction disks 11, and the clutch disk 9 in tight frictional contact one with the other and therefore the driven pulley 4 locked into engagement with the shaft 1. As the shaft and pulley are rotated the governor weights 24 are carried outward by the centrifugal tendency which outward movement of the weights acting through the toggle links 21 tends to cause the pulley 4 and the collar 19 to approach each other against the tension of the interposed helical spring 25. The return movement of the collar 19 under the influence of the spring 25 is limited by a pair of lock nuts 26 located upon a medial screw threaded portion 27 of the shaft 1. The shifting movement of the pulley 4 against the tension of the helical spring 25 releases to a greater or less degree the frictional engagement of the web 10, the disks 11 and the clutch disk 9 in proportion to the velocity of the governor weights 24 thereby permitting the shaft 1 a greater or less degree of rotation independent of the driven pulley 4. By adjusting the lock nut 26 the tension of the spring 25 will be varied thereby affecting the relase of the driven pulley 4 at predetermined higher or lower rates of speed. It is to be understood that the tension of the spring 25 is so adjusted by the adjustment of the lock nuts 26 that the driven pulley 4 will be momentarily disengaged from the shaft 1 only when the rate of rotation exceeds the normal or predetermined speed.

When in a state of rest the driving pulley 3 is normally disconnected from the shaft, while the driven pulley 4 is normally locked in engaged position with the shaft 1 by the close frictional engagement of the web 10, disk 11 and the clutch disk 9. Upon starting the motor the pulley 3 will initially rotate free of the shaft. However, as the speed of rotation increases the pulley 3 by shifting slightly in a longitudinal direction upon the shaft 1 will engage with every increasing pressure the friction disks 7 and the clutch disk 5 until the normal rate of speed has been reached. The spring 25 having been previously adjusted by means of a lock nut 26 to a proper degree of tension sufficient to hold the driving pulley in driving connection with the shaft at a normal rate of speed any acceleration of the speed above the normal rate will cause the pulley 4 to be momentarily shifted to a slight degree upon the shaft 1 against the tension of the spring 25 to decrease the frictional contact with the disks 11 and the clutch disks 9 whereby the driven pulley 4 will be freed from the shaft. As the driven pulley 4 is freed from the shaft its rate of rotation will slightly decrease whereupon the spring 25 will again force it longitudinally into frictional contact with the disks. The arrangement is such that the pulley will be maintained in a balanced position with relation to the rate of speed whereby upon a slight acceleration of the speed it will release its hold upon the driving shaft and will reëngage again upon a diminution of the speed.

In Fig. 3 is shown a modification of the construction hereinbefore described. In this modified form of apparatus the same shaft 1 with the driving pulley 3 and the driven pulley 4 loosely journaled thereon are employed. Secured in fixed position upon the shaft 1 adjacent to the driving pulley is the same clutch disk 5 coöperating with the friction disks 7 corresponding with the similar parts in the primary construction. Loosely journaled upon the shaft 1 on the inner side of the driven pulley 4 is a clutch disk 27. Intermediate the clutch disk 27 and web of the pulley 4 are located one or more friction disks 28. This construction is similar to that before described except that the driven pulley and frictional clutch members are assembled in reverse relation and the clutch disk 27 is loose upon the shaft. A stop collar 29 is secured upon the shaft 1 at the outer side of the driven pulley 4 to limit the sliding movement of the pulley upon the shaft in outward direction. Located upon the shaft 1 intermediate the two pulleys is a collar 30, secured in fixed relation upon the shaft by set screws, whereby the collar may be adjusted to different positions in relation to the pulley 4. A helical spring 31 surrounds the shaft 1 and bears at one end upon the collar 30 and at its opposite end upon the clutch disk 27 which is capable of a longitudinal movement upon the shaft. Several pairs of toggle links 32 are provided, said links being pivotally attached at one end to lugs or ears 33 upon the driving pulley 3 and at their opposite end to corresponding lugs or ears 34 upon the clutch disk 27. The toggle links 32 carry at medial points governor weights 35 which tend to move outward through centrifugal tendency as the driving pulley 3 is rotated. The construction is such that upon the initial rotation of the apparatus the outward movement of the governor weights will tend to shift the driving pulley 3 longitudinally upon the shaft 1 into frictional engagement with its corresponding frictional disks and clutch disk. When an excessive rate of speed is attained which would tend to carry the governor weight outward an additional degree the sliding clutch disk 27 is reciprocated inward against the tension of the spring 31 to free the driven pulley 4 upon the shaft. As the speed decreases the clutch 27 and frictional clutch 28 under the influence of the spring 31 will again engage the driven pulley 4. A spring 36 connecting the governor weights 35 is provided to assist in return movement of the parts, against the tension of which the weights at all times operate. Similar springs 37 connect the governor weights 18 of the primary construction. These springs are preferably arranged in pairs with one spring upon each side of the weights in each form of apparatus. The springs engage perforated bosses 38 on the weights. Each spring is provided with an adjustment bolt 39 by which the tension may be regulated to cause the engagement of the driving pulley 3 and its friction clutch at a higher or lower rate of speed.

From the above description it will be apparent that there is thus produced a device of the character described possessing the particular features of advantage before enumerated as desirable but which obviously is susceptible of modification in its form, proportion, detail construction and arrangement of parts without departing from the principle involved or sacrificing any of its advantages.

While in order to comply with the statute, the invention has been herein described in language more or less specific as to certain structural features, it is to be understood that the invention is not limited to any specific details but that the means and mechanism herein shown and described comprise but one mode of putting the invention into effect and the invention is therefore claimed broadly in any of its possible forms or modifications within the scope of the appended claims.

Having thus described my invention, I claim:

1. In a speed governor, a shaft, a driving pulley adapted to be connected with the driving motor and a driven pulley adapted to be connected with the driven machine revolubly journaled thereon, a set of friction clutch devices normally connecting the driven pulley with the shaft, a second set of friction clutch devices adapted to connect the driving pulley with the shaft, said driving pulley being normally disconnected from the shaft, governor weights controlled by centrifugal tendency and adapted by their initial operation to cause the driving pulley to be engaged with the shaft, and upon rotation at an excessive speed adapted to cause the driven pulley to be disconnected from the shaft, substantially as specified.

2. In a speed governor, a shaft, a driving pulley and a driven pulley mounted upon the shaft, clutch means for operatively connecting said pulleys with the shaft, a spring for normally maintaining the driven pulley clutch mechanism in operative position whereby the driven pulley will be operatively engaged with the shaft, said driving pulley being normally disconnected from the shaft, centrifugally operated governor weights adapted to operate the clutch mechanism of the driving pulley to connect said driving pulley with the shaft when said pulley has attained sufficient speed to affect said governor weights and to operate said clutch mechanism of the driven pulley against the tension of the spring to disconnect the driven pulley when the speed exceeds certain predetermined limits, substantially as specified.

3. In a speed governor, a shaft, a drive and a driven pulley, said pulleys being both revolubly and longitudinally movable on said shaft, disks fixed upon said shafts with which the pulleys are frictionally connected and disks connected by their longitudinal movement upon the shaft, governor weights operated by centrifugal tendency and adapted by their operation to shift the pulleys longitudinally upon the shaft into and out of frictional engagement with the disks, said drive pulley being normally disconnected and adapted to be connected by the operation of the governor weights, the driven pulley being normally connected and adapted to be disconnected by the operation of the weights, substantially as specified.

4. In a speed governor, a shaft, a driving and a driven pulley both revolubly and longitudinally movable upon said shaft, clutch mechanism for operatively engaging the pulleys with the shaft with which the pulleys are engaged and disengaged by their longitudinal movement upon the shaft, the driving pulley being normally disengaged from its clutch mechanism, a sleeve revolubly mounted upon the shaft adjacent to the driving pulley, toggle links connecting the sleeve to the driving pulley, governor weights carried by the toggle links adapted to shift under centrifugal tendency and thereby adapted to draw the driving pulley longitudinally into engagement with its clutch, and a second sleeve mounted upon the shaft adjacent to the driven pulley, toggle links connecting the second sleeve with the driven pulley, governor weights carried by the toggle links adapted to shift under centrifugal tendency and thereby adapted to draw the driven pulley longitudinally out of engagement with its corresponding clutch mechanism when the pulley has attained a predetermined limit of speed, substantially as specified.

5. In a speed governor, a shaft, driving and driven pulleys revolubly mounted on the shaft clutches for each of the pulleys adapted to operatively engage the pulleys with the shaft, said driving pulley and its clutch being normally disengaged, said driven pulley and its clutch being normally engaged, governor weights operated by centrifugal tendency adapted by their movement to cause the engagement of the driving pulley and its clutch at a given rate of speed and to cause the disengagement of the driven pulley and its clutch at a higher rate of speed, substantially as specified.

6. In a speed governor, a shaft, driving and driven pulleys revolubly mounted on the shaft, clutches for each of the pulleys adapted to operatively engage the pulleys with the shaft, said driving pulley and its clutch being normally disengaged, a spring tending to normally hold the driven pulley in engagement with its clutch, governor weights adapted by their movement to cause the engagement of the driving pulley and its clutch at a given rate of speed, and to cause the disengagement of the driven pulley from its clutch against the tension of said spring at a higher rate of speed, substantially as specified.

7. In a speed governor, a shaft, driving and driven pulleys revolubly mounted on the shaft, clutches for each of the pulleys adapted to operatively engage the pulleys with the shaft, said driving pulley and its clutch being normally disengaged, a spring tending to normally hold the driven pulley in engagement with its clutch, governor weights adapted by their movement to cause the engagement of the driving pulley and its clutch at a given rate of speed, and to cause the disengagement of the driven pulley from its clutch against the tension of said spring at a higher rate of speed, and means to vary the tension of said spring whereby the driven pulley will be engaged and disengaged at higher or lower rates of speed, substantially as specified.

8. In a speed governor, a shaft, driving and driven pulleys revolubly mounted on the shaft, clutches for each of the pulleys adapted to operatively engage the pulleys with the shaft, said driving pulley and its clutch being normally disengaged, a helical spring surrounding the shaft and tending to normally hold the driven pulley and its clutch in engagement, governor weights operated by centrifugal tendency to cause the engagement of the driving pulley and its clutch and to cause the disengagement of the driven pulley and its clutch against the tension of the spring at a higher rate of speed, and an adjustable abutment for said spring carried on said shaft whereby the tension of the spring may be varied to
5 effect the disengagement of the driven pulley at a higher or lower rate of speed, substantially as specified.

In testimony whereof, I have hereunto set my hand this 14th day of November, 1912.

CHARLES O. KENNEDY.

Witnesses:
HEY F. NOLAN,
EFFIE B. SHOMO.

Copies of this patent may be obtained for five cents each, by addressing the "Commissioner of Patents, Washington, D. C."